(12) United States Patent
Andrews et al.

(10) Patent No.: US 6,657,320 B1
(45) Date of Patent: Dec. 2, 2003

(54) INTEGRATED FLYWHEEL UNINTERRUPTIBLE POWER SUPPLY SYSTEM

(75) Inventors: James A. Andrews, Austin, TX (US); David A. Badger, Austin, TX (US); Robert L. Fuller, Georgetown, TX (US); Randal A. Lee, Austin, TX (US); David E. Perkins, Austin, TX (US); James R. Pitt, Austin, TX (US); Dave J. Wehrlen, Austin, TX (US)

(73) Assignee: Active Power, Inc., Ausitn, TX (US)

( * ) Notice: Subject to any disclaimer, the term of this patent is extended or adjusted under 35 U.S.C. 154(b) by 0 days.

(21) Appl. No.: 09/433,528

(22) Filed: Nov. 3, 1999

(51) Int. Cl.[7] .................................................. C02J 7/00

(52) U.S. Cl. ............................ 307/64; 307/47; 361/695

(58) Field of Search ............................... 307/47, 64–68; 361/695

(56) References Cited

U.S. PATENT DOCUMENTS

| | | | | |
|---|---|---|---|---|
| 4,168,459 A | * | 9/1979 | Roesel, Jr. ................... | 310/112 |
| 4,406,950 A | * | 9/1983 | Roesel, Jr. ................... | 290/4 C |
| 4,412,170 A | * | 10/1983 | Roesel, Jr. .................... | 307/64 |
| 4,444,444 A | * | 4/1984 | Benedetti et al. ........... | 310/90.5 |
| 4,460,834 A | * | 7/1984 | Gottfried ...................... | 307/64 |
| 4,471,233 A | | 9/1984 | Roberts | |
| 4,754,607 A | | 7/1988 | Mackay | |

(List continued on next page.)

FOREIGN PATENT DOCUMENTS

| | | | | |
|---|---|---|---|---|
| JP | 1-286745 | * | 11/1989 | ............. H02J/9/06 |
| WO | WO 98/43341 | | 10/1998 | |
| WO | WO 99/32762 | | 7/1999 | |

OTHER PUBLICATIONS

Full English Translation of Japanese Published Unexamined Patent Application 1–286745, Published Nov. 17, 1989; Application Filing No. 63–1115695, Filed May 12, 1988; Inventor Isao Takahashi et al.; Assignees: Isao Takahashi, Mitsubishi Electric Corp.* www.rotoups.com—product literature on DESS system, article from Apr., 1998.* www.acumentrics.com—product literature on POWER-QUE, article from Sep. of 1997.*

"Acumentrics Introduces First Commercially Available Line of Composite Rotor Flywheels," press release published by Acumentrics Corporation, Sep. 9, 1997.

"Pulse Power System," press release published by Acumentrics Corporation, Sep. 9, 1997.

"Acumentrics Introduces Composite Flywheel Based 250KVA Full On–Line UPS," press release published by Acumentrics Corporation, Nov. 9, 1999, obtained from the Internet at http://www.acumentrics.com/NE11091999.html on Dec. 20, 2001.

Primary Examiner—Gregory J. Toatley, Jr.
(74) Attorney, Agent, or Firm—Fish & Neave; Robert W. Morris; George L. Kanabe (57) ABSTRACT

Integrated flywheel uninteruptible power supply (UPS) systems provide reliable back-up power protection in a single integrated housing unit. The integration of the two normally independent systems results in a synergism such that various components may be shared between the systems. For example, the flywheel unit and the UPS electronics unit may utilize a single cooling system that is less complex and requires less energy to operate than two independent cooling systems. Other shared components may include at least control circuitry, user and display interface circuitry, fusing, DC bus capacitors, and emergency shut-off circuitry.

31 Claims, 8 Drawing Sheets

U.S. PATENT DOCUMENTS

| | | |
|---|---|---|
| 4,772,999 A | 9/1988 | Fiorina et al. |
| 4,835,405 A | 5/1989 | Clancey et al. |
| 4,885,492 A * | 12/1989 | Van Sickle ............. 310/102 R |
| 5,366,827 A | 11/1994 | Belanger et al. |
| 5,420,469 A | 5/1995 | Schmidt |
| 5,433,175 A | 7/1995 | Hughes et al. |
| 5,563,802 A | 10/1996 | Plahn et al. |
| 5,646,458 A * | 7/1997 | Bowyer et al. ................ 307/67 |
| 5,714,941 A * | 2/1998 | Gandre ....................... 324/163 |
| 5,731,645 A | 3/1998 | Clifton et al. |
| 5,767,591 A * | 6/1998 | Pinkerton .................... 307/64 |
| 5,789,828 A | 8/1998 | Tremaine et al. |
| 5,813,243 A * | 9/1998 | Johnson et al. ............ 62/259.2 |
| 5,818,125 A * | 10/1998 | Manchester .................. 307/66 |
| 5,994,794 A * | 11/1999 | Wehrlen ....................... 307/64 |
| 6,020,657 A * | 2/2000 | Liran .......................... 307/64 |
| 6,023,152 A * | 2/2000 | Briest et al. .................. 307/67 |
| 6,042,348 A * | 3/2000 | Aakalu et al. ........... 417/423.5 |
| 6,240,337 B1 * | 5/2001 | Marr et al. ................. 700/286 |
| 6,262,505 B1 * | 7/2001 | Hockney et al. ............... 310/51 |

* cited by examiner

FIG. 9

INTEGRATED FLYWHEEL UNINTERRUPTIBLE POWER SUPPLY SYSTEM

BACKGROUND OF THE INVENTION

This invention relates to uninterruptible power supply ("UPS") systems, and more particularly to UPS systems used in combination with flywheel energy storage devices. The UPS's of the present invention include one or more flywheel energy storage devices that are integrated with the UPS within a single housing. Thus, the integrated unit appears, externally, to be a single component.

UPS systems are well known. For example, one UPS system is described by Roberts U.S. Pat. No. 4,471,233, entitled "Emergency Power System" (the '233 patent"). The '233 patent describes a motor-generator set ("genset") that is converted into a "complete uninterruptible power supply" by adding a logic-controlled, battery-powered inverter that operates upon the failure of utility power. In such systems, a bank of chemical batteries (typically conventional automobile batteries) is connected to a battery charger that provides a trickle charge to keep the batteries energized during normal operations.

The bank of batteries then typically is located remote from the UPS electronics, at least in part, due to the various safety considerations related to the general nature of the large quantities of caustic chemicals involved. Moreover, chemical batteries, suffer from various deficiencies including bulkiness, lack of reliability, limited lifespan, high maintenance costs and relatively low safety. For example, typical large battery installations (depending on the quantity of back-up power required) often require special venting and air-conditioning systems for the dedicated battery storage rooms.

One solution for the problems related to batteries, is to provide an alternate back-up energy source, such as a flywheel energy storage unit. One example of such a UPS system is described by Gottfried U.S. Pat. No. 4,460,834, entitled "Uninterruptible Power System" (the "'834 Patent"). The '834 Patent describes a UPS system in which a flywheel is used to provide back-up energy to an external load in the event of a short term loss of utility power (long term back-up power, in most instances, is provided by a diesel powered genset). Systems such as that described in the '834 patent typically include a controller unit, a long term back-up power unit, and a short term back-up power unit. The controller often includes transfer switches, control electronics, and input/output lines that interconnect utility power, short term back-up power, and long term back-up power to the load. The short term power unit may include a motor, a generator and a flywheel unit (see, e.g., column 4, lines 51–60).

Common problems with existing systems, regardless of whether they utilize a flywheel or batteries for short term back-up power, include large floor-space requirements, excessive cooling requirements, reduced reliability, and high cost due, at least in part, to multiple electronic control systems. Additionally, UPS systems that rely on batteries for short term back-up power also suffer from increased safety problems related to the caustic nature of the battery acid, such as additional venting requirements.

In view of the foregoing, it is an object of this invention to provide improved UPS systems that efficiently provide short term back-up power to a load.

It also is an object of this invention to provide improved UPS systems that have reduced cooling requirements.

It further is an object of this invention to provide improved UPS systems that have a reduced "footprint," in that they take up less floor space than conventional UPS systems.

A still further object of this invention is to provide methods and apparatus for reducing the manufacturing costs related to UPS systems.

SUMMARY OF THE INVENTION

These and other objects of the invention are accomplished in accordance with the principles of the invention by providing integrated flywheel UPS systems that are contained in a single physical unit. The preferred embodiments include a compact flywheel energy storage unit that is mounted to a chassis that also contains UPS controller electronics. The two otherwise independent systems are configured such that a single cooling system may be employed to cool the integrated unit. Moreover, locating the otherwise independent systems in a single housing enables the system designers to utilize, for example, shared: control electronics, displays, user interface systems, fusing, DC bus capacitors, and other provisions, such as a shared emergency shut-off system. Additional advantages occur because certain interconnecting components are eliminated in their entirety. The single housing unit is substantially smaller than the combination of the two individual units, and thus has a smaller footprint than conventional systems.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
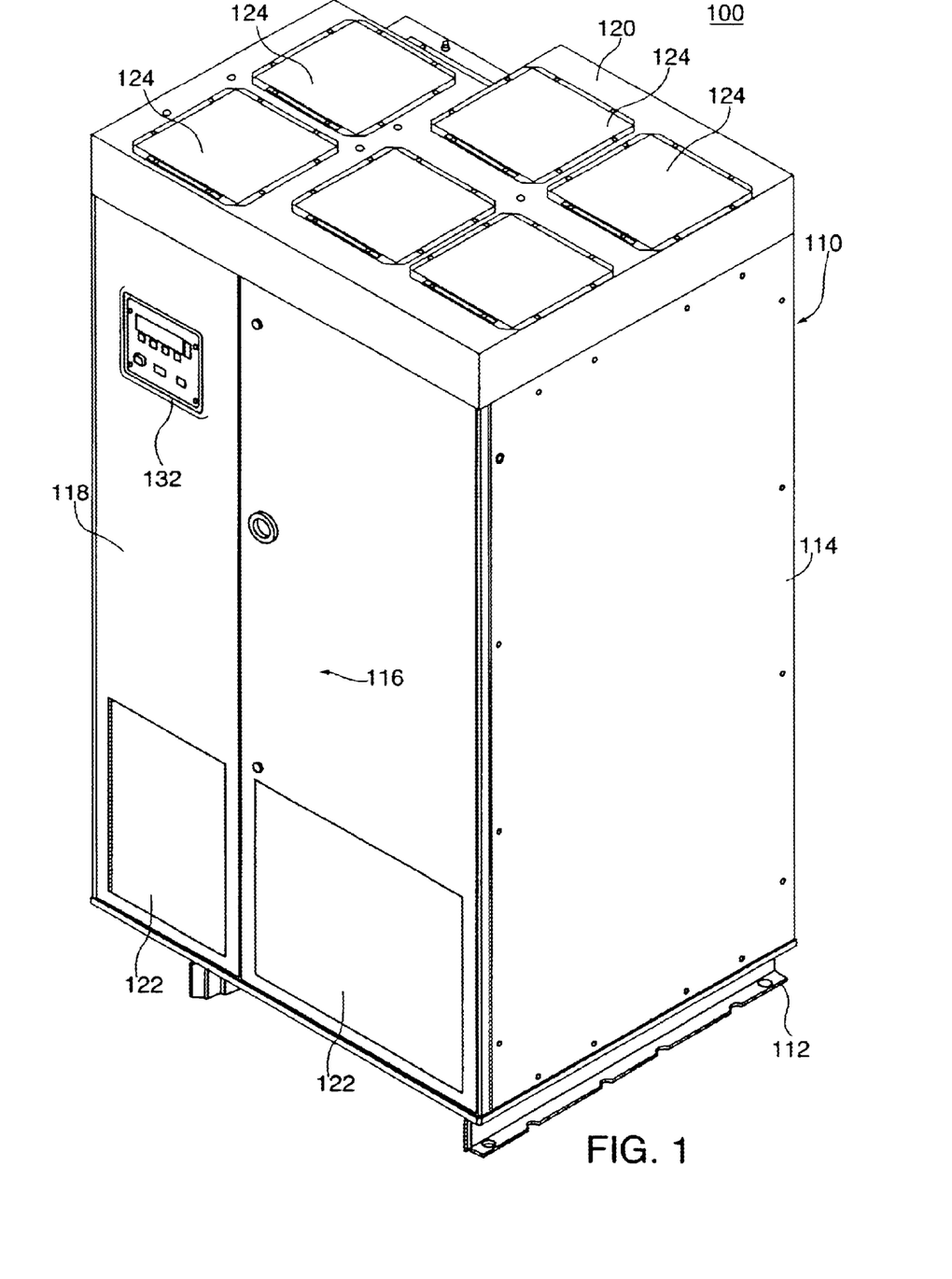
FIG. 1 is a three-dimensional perspective view of an integrated flywheel UPS system constructed in accordance with the principles of the present invention.

FIGS. 1–4 show a three-dimensional perspective view of integrated flywheel UPS system 100 constructed in accordance with the principles of the present invention. Integrated UPS 100 includes housing 110—which includes base 112, side panels 114 (only one of which is shown in FIG. 1), access door panels 116 and 118, and lid 120—flywheel back-up energy storage unit 220 (shown on FIGS. 2–4), UPS controller electronics 240 (shown in FIGS. 2–4), and cooling system 260. Each of the core elements of integrated UPS 100 provides multiple advantages over conventional systems, and thus, are described separately below.

In general, integrated UPS 100 provides, in a single-unit having a small footprint, a system that produces back-up power to a load in the event of a loss of primary power, such as utility power. One critical feature of UPS systems in general, is that they provide a continuous power feed to the load under all conditions. While such systems have always had their place, for example, in manufacturing environments where a continuous production process is used that requires a systematic, planned shutdown, the increased proliferation of 24/7 computer systems—such as internet servers—has created a great need for simpler and cheaper ways to prevent power loss. The present invention addresses those needs by providing smaller, simpler, less expensive, and more reliable uninterruptible power supply systems.

One feature of the present invention is that integrated UPS 100 has substantially lower cooling requirements than a system with similar components that are individually housed. The control electronics for both the flywheel unit and the UPS have specific cooling requirements that relate to the maximum allowable operating temperature of the individual devices (e.g., the semiconductor switches used to transfer power). One of the most reliable ways to cool such devices employs a forced air convection cooling system. In conventional systems, one set of fans would be utilized to cool the flywheel system and another set of fans would cool the UPS, resulting in higher costs and a reduction in overall system reliability.

Integrated UPS 100 of the present invention utilizes a single array of fans (not shown) that draw heat from heat sinks 262 (see FIGS. 1 & 3, the fans are located beneath dampers 124) that are located on top of the unit. In addition, for a further increase in reliability, the number of fans in integrated UPS 100 is one more than necessary for proper cooling (persons skilled in the art will appreciate that sufficient cooling is maintained even if any one of the fans fails). The fan array draws cooling air into the integrated unit through filtered air inlets 122 (see FIG. 1). The cooling air is initially utilized to cool flywheel unit 220. The same cooling air then is directed through the enclosure so that it provides cooling for the components located in the middle of the chassis (generally indicated as reference numeral 230). The same cooling air then is directed over the heat sinks (generally indicated as reference numeral 235) prior to being exhausted from the unit through lid 120.

Persons skilled in the art will appreciate that the sequence of components the cooling airflow travels over can have a significant effect on the efficiency and ability of the cooling system to cool the unit. For example, due to natural buoyancy effects of air, it is preferable to have the cooling airflow circuit begin at the bottom of the unit. Moreover, because the flywheel typically has a lower allowable maximum temperature than the power electronic components, and because the mass of the flywheel unit results in it being mounted on the bottom of the chassis, the cooling air thus passes over the flywheel first, when the most cooling is available. Further efficiency results from the fact that the cooling air experiences the slightest temperature rise from the flywheel, and the highest from the heat sinks. By utilizing a single cooling system, overall system efficiency and reliability are improved, while manufacturing cost and time are reduced.

Figure 2:
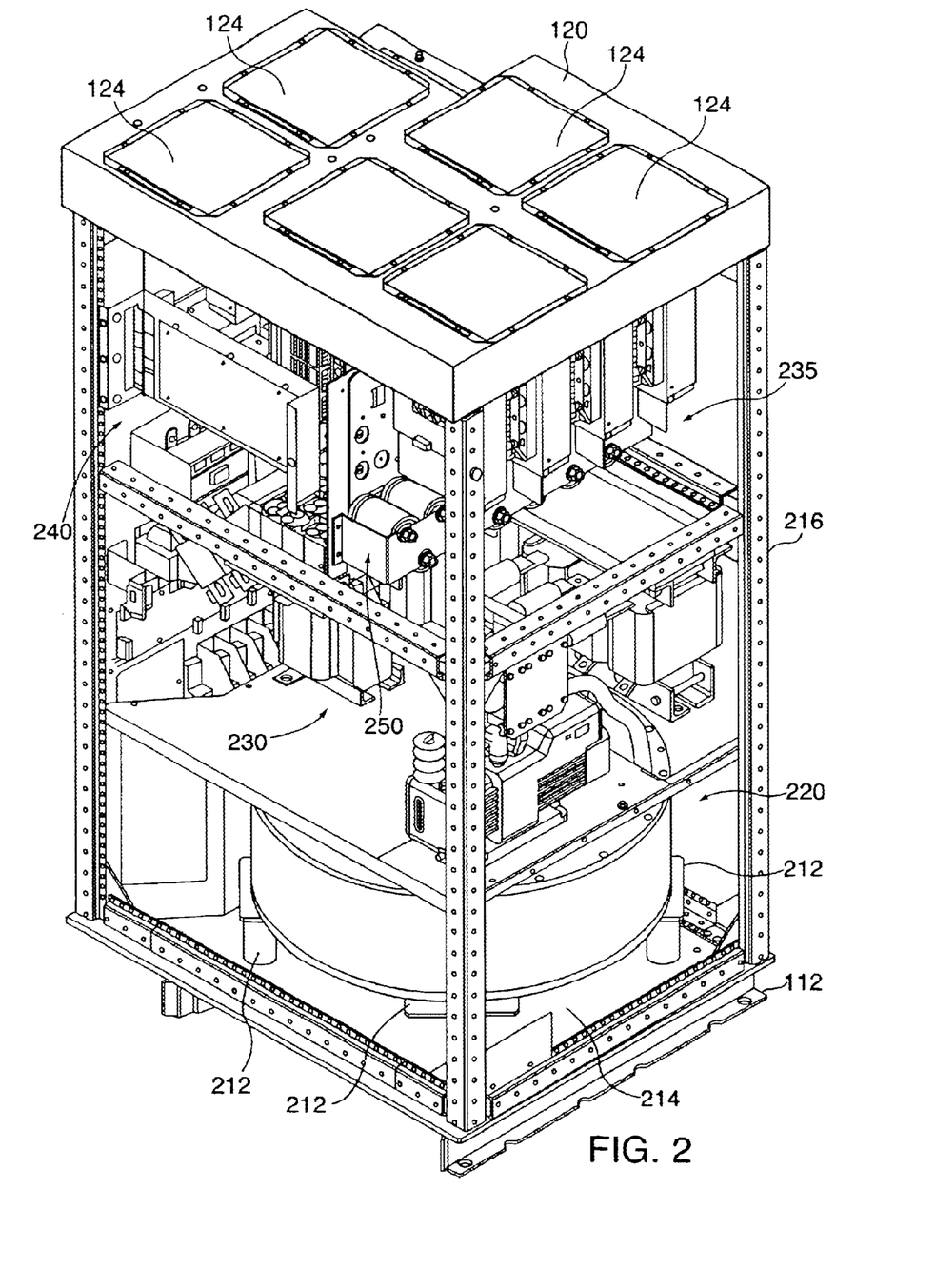
FIG. 2 is a three-dimensional perspective view of an integrated flywheel UPS system showing internal components constructed in accordance with the principles of the present invention.
Figure 4:
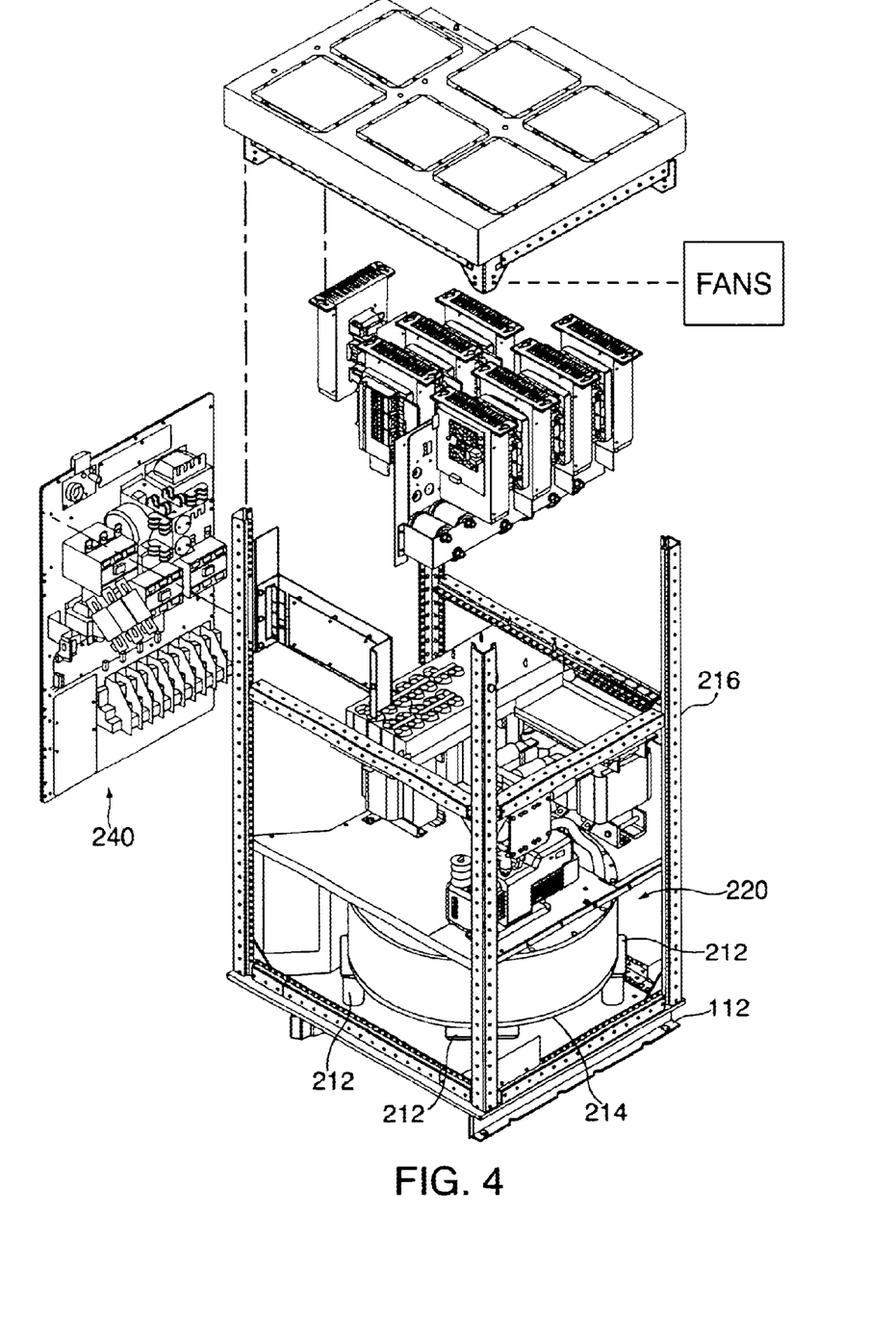
FIG. 4 is a three dimensional, partially exploded, perspective view of an integrated flywheel UPS system showing internal components constructed in accordance with the principles of the present invention.

Another aspect of the present invention related to cooling is illustrated on FIGS. 1–2, and 4. In forced convection cooling systems, the forced air is collected in a common volume or plenum prior to distribution in the atmosphere. Reliability in these systems is increased through the use of redundant fans, including blowers and pumps. The air moves through the system due to, at least in part, the pressure differential created by the fans. If, however, one of the fans fails, an air leak is established that can have a negative impact on the differential pressure of the plenum, and thereby reduce overall system performance.

The present invention overcomes these deficiencies by utilizing individual dampers 124 on each of the fans. Dampers 124, which for example may be a hinged rubber flap, open and close based on the differential air pressure. When flaps are used, the dampers are operated passively, opening and closing in response to pressure changes. If a fan fails, the flap automatically closes and remains closed due to the pressure differential. Otherwise, the efficiency of the cooling system would be negatively affected by the air leaking through the disabled fan. Dampers 124 also may be implemented using vents or shutters that are actively controlled in order to further optimize the air flow. Of course, the use of actively controlled dampers would result in an increase in manufacturing costs and complexity over passively controlled dampers. A further advantage of dampers 124 is that, as shown in the figures, they are located external to housing 114. This reduces their complexity, enables the cooling system to take up less space within the housing, and provides an additional reduction in manufacturing costs.

Figure 3:
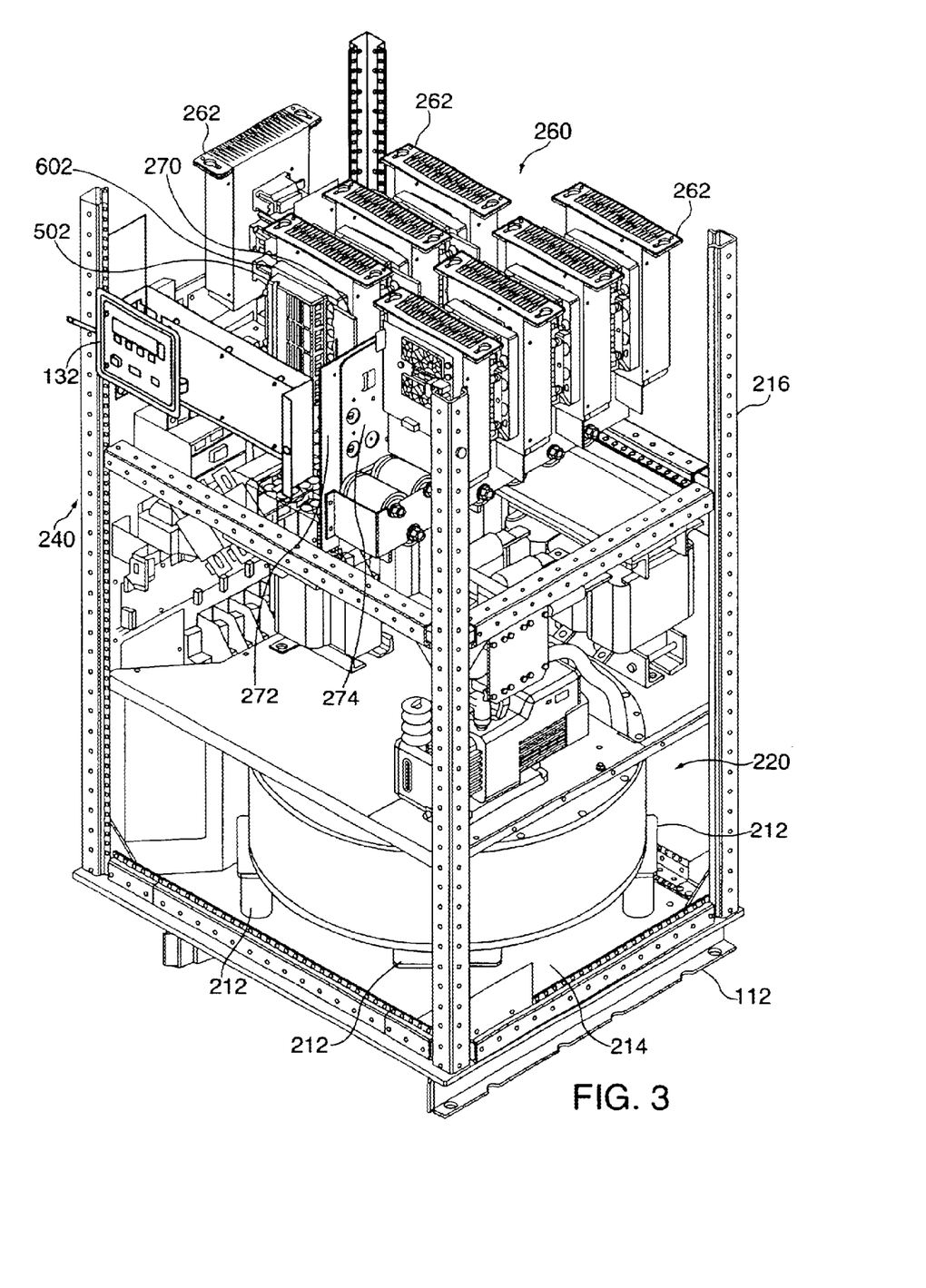
FIG. 3 is another three-dimensional perspective view of an integrated flywheel UPS system showing internal components constructed in accordance with the principles of the present invention.

The single, integrated housing feature of the present invention provides additional advantages over convention UPS/back-up power systems. One of the primary advantages is the elimination of duplicate components and circuitry that previously was located in two, separate, housings (one for the flywheel control electronics and another for the UPS control electronics). For example, FIGS. 1 and 3 show a common, shared interface panel 132 that users utilize to monitor and interface with both the flywheel control system and the UPS control system, thereby eliminating an interface device and further reducing costs. The figures also show UPS electronics 240, which, in addition to providing system control for the UPS, also provides system control function for the flywheel. These functions may be implemented using, for example, specialized programmable circuitry, such as field programmable gate arrays (FPGAs) (see, for example, the FLEX® FPGAs that are available from Altera Corporation), digital signal processors, and microprocessors.

Such circuitry, however, often is not fully utilized by a single control system. The present invention requires significantly less control circuitry to operate by combining control functions within a single controller. An additional advantage is that, by combining the control systems, efficiency and operational capability are further enhanced due to shared information. For example, in a typical flywheel energy back-up system, the flywheel control system monitors the DC bus voltage in order to determine when to discharge—a drop in voltage is assumed to be a loss of utility power. This, however, causes an undesirable delay in the response time of the flywheel system, thereby limiting the size of the load that the flywheel can quickly respond to. In the present invention, the inverters that supply power to the load from the flywheel and the utility are controlled by the same control system so that they provide a seamless bi-directional power train to the load. Therefore, as soon as any reduction in power occurs from the utility, power from the flywheel is drawn through the flywheel inverters to compensate, so that the load is provided with the same amount of power, regardless of the source.

High power electronic systems, such as the flywheel system and the UPS system, utilize numerous components, such as switches and capacitors to control and direct the flow of power from a source to the load. The switches, which are often expensive, high power semiconductor switches, also are crucial components in protecting the control circuits and load when faults occur. Integrated UPS 100, because it contains both the flywheel and UPS components, requires less switches and interconnecting components than conventional systems. In addition, other components, such as the DC bus capacitors and emergency shutdown circuitry, may be shared between the flywheel and UPS, thereby reducing manufacturing costs and time, as well as overall size requirements.

Moreover, the individual switches typically are configured into multi-parallel switching devices to handle the current of the load. To insure that the current is equally shared between the devices, the impedance of each parallel path must be balanced. Two known approaches to address balance problems are multi-layered bus plates and symmetric bus plates. In the multi-layer design, a series of plates are laid on top of each other, so that each plate handles one of the multi-parallel current paths. It can be difficult, however, to electrically insulate the plates from each other, which results in an expensive system to handle multi-parallel current. Moreover, because of the layering, multi-layer bus plates often are constrained to a single plane. Symmetric bus plates, on the other hand, are relatively inexpensive, but become increasingly difficult to successfully match impedance as the number of multi-parallel switching devices increases beyond two.

Figure 5:
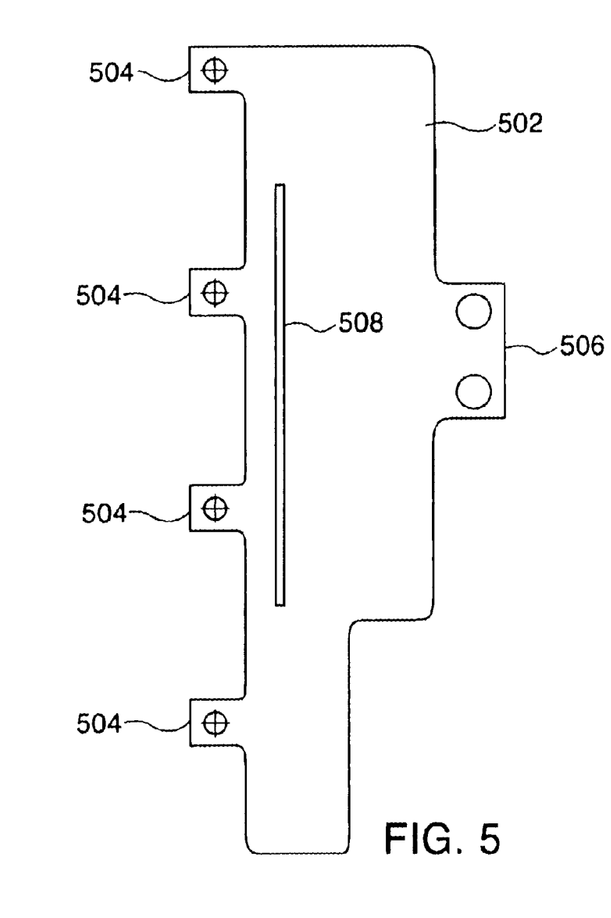
FIG. 5 is a plan-view of a slotted bus plate in accordance with the principles of the present invention.
Figure 6:
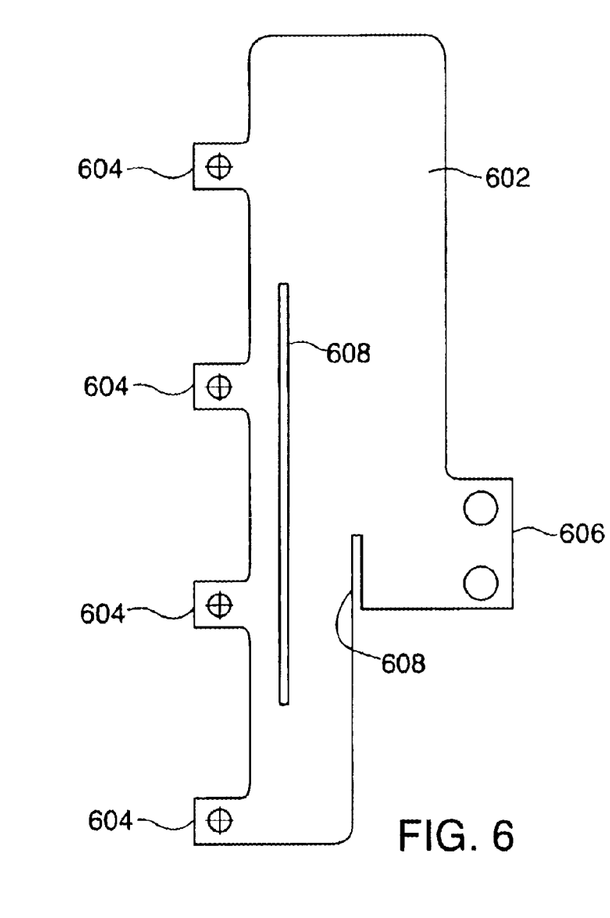
FIG. 6 is a plan-view of another slotted bus plate in accordance with the principles of the present invention.
Figure 7:
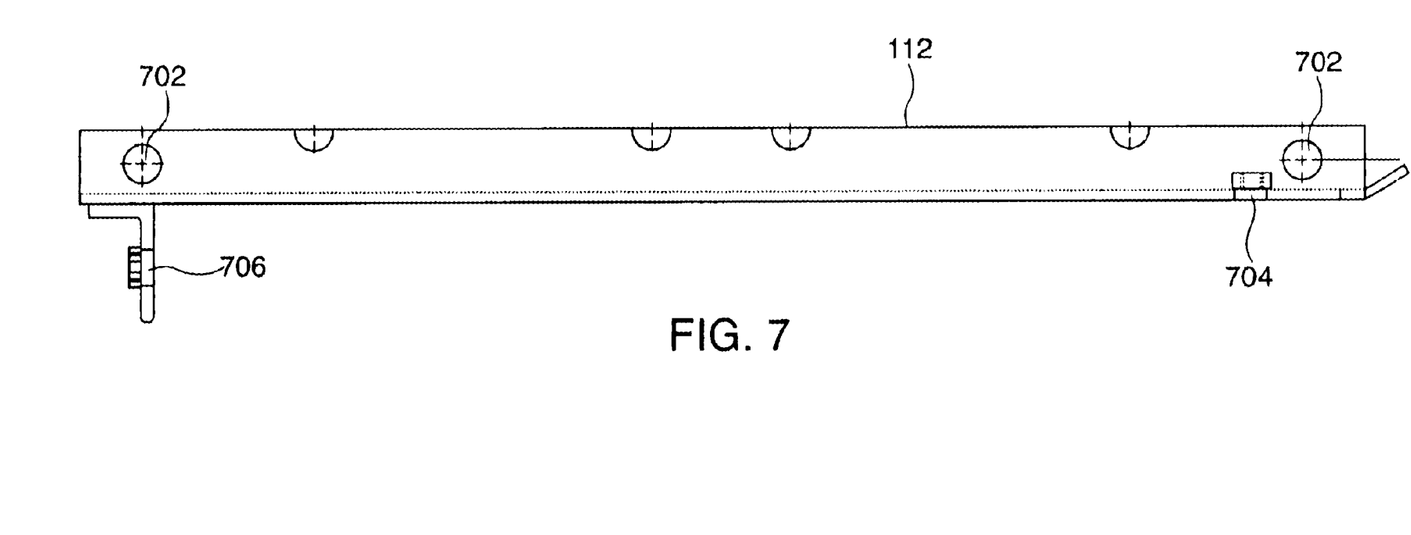
FIG. 7 is a schematic illustration of a mounting cleat in accordance with the principles of the present invention.

In accordance with another feature of the present invention, integrated UPS 100 utilizes slots within a bus plate to balance the impedance for multi-parallel current paths. This feature of the present invention is illustrated in FIGS. 5 and 6, which show slotted bus plates 502 and 602. The slotted bus plate approach is relatively inexpensive and provides a power system designer with great flexibility because of the lack of limitations on the design (e.g., multiple planes may be used, and the design need not be symmetric, thus it is more easily implemented when the number of switching devices is three or more).

Bus plates 502 and 602 operate, for example, by inputting four equal currents into input terminals 504 and 604, respectively. The four input currents exit the bus plates via output terminals 506 and 606, respectively. Each of bus plates 502 and 602 includes one or more current sharing slots 508 and 608, that are configured to insure that the impedance of each parallel path is matched. The current sharing slots vary depending on the location of output terminals 506 and 606. Bus plates 502 and 602 may be used together such as, for example, where bus plate 502 is the positive plate and bus plate 602 is the negative plate, and the bus plates are then stacked together.

The use of plates 502 and 602 permits additional benefits. For example, FIG. 3 shows bus plates 502 and 602 in a stacked configuration at location 270 (at location 270, bus plate 602 is shown in front of bus plate 502). The stacked configuration enables output terminals 506 and 606 to be connected to a pair of collection bus plates 272 and 274 that collect either positive or negative current from each of bus plates 502 and 602. This configuration, in addition to the advantages described above, permits easy access for maintenance servicing through the front of housing 110 without requiring major disassembly of the entire DC bus assembly.

Another typical problem in flywheel power systems is related to load current. For example, the combined load current and flywheel motor current must not exceed either the rated input current or the rated current of the connecting service (the connecting service may, for example, be utility power). One conventional solution to this problem is to set the maximum motor current so that input limits are never exceeded when the system operates at full load current. This solution, however, results in an inefficient use of energy that otherwise might be used to recharge the system, because very few, if any, system are 100% fully loaded. Accordingly, it then takes longer to recharge the flywheel system after a discharge, and the user achieves less protection from outages.

Integrated UPS 100, however, overcomes these problems by automatically adapting the recharging profile based on loading conditions. For example, during low load conditions, the system automatically increases motor current so that the flywheel is recharged (i.e., spun back up to its maximum speed) as quickly as possible. On the other hand, during high load conditions, the system automatically reduces motor current so that the input limits are not exceeded. This results in the system recharging the flywheel in the shortest, yet safest, amount of time.

High power systems, such as UPS and flywheel systems, typically utilize DC electrolytic capacitors as filtering elements in the inverter circuits. Multiple capacitors are configured together in parallel to form a capacitor bank that provides the required capacitance and low impedance. Electrolytic capacitors, however, have a finite life upon which failure occurs. Failure may simply produce a venting of some of the electrolyte, or may even result in a rupture of the capacitor casing. The loss of the capacitor typically results in system downtime.

One traditional method for addressing this problem is systematic, regularly scheduled, preventative maintenance, in which the capacitors are replaced prior to failure. This approach, however, is costly and requires system downtime to be accomplished. Integrated UPS 100 avoids these problems by utilizing fusible links and redundant capacitors in capacitor bank 250 (see FIG. 2). The fusible links are strips of metal that, upon failure of the capacitor, fuse open, thereby protecting the system. The failure is reported, for example, on a system maintenance log or provided to the user as an alert. Integrated UPS 100, however, remains operational through the use of a redundant capacitor because the faulty capacitor has been isolated from the system by the fusible link. Replacement of the failed capacitor can then be scheduled at a time when integrated UPS 100 is not required to be operational (rather than having the downtime of the UPS drive the maintenance schedule).

Another feature of the present invention is related to the compact flywheel unit 220 that is mounted within housing 110. Due do the small size of flywheel unit 220, it may easily be mounted in the bottom of housing 110. Flywheel 220 may, for example, be a flywheel unit such as that disclosed in Clifton et al. U.S. Pat. No. 5,731,645 ("the '645 patent").

In another embodiment of the present invention, flywheel unit 220 includes a pair of sleeved bearings that are placed between the shaft bearings and the flywheel housing. The sleeved bearings are particularly useful in applications such as the present integrated UPS system, where the bearing journals are very small and the rotor is relatively large. Under such circumstances, precise balance and alignment is crucial to the operation of the flywheel, especially at high speeds. By utilizing sleeved bearings on the upper and lower shaft portions of the flywheel, manufacturing tolerances between the bearings, the shaft and the housing can be relaxed. This provides for a reduction in manufacturing costs, as well as increased reliability because the sleeves prevent the flywheel from imparting vibration to the machine housing, and also permit axial and radial movement during temperature changes and transient events.

Flywheel 220 may also include various other improvements over the flywheel apparatus described in the '645 patent. For example, known flywheels that include a switched motor/generator, such as flywheel 220, must include some type of commutation sensor for accurate switching, and additional sensing equipment to monitor vibration so that the flywheel can be shutdown if an unsafe condition occurs. Traditionally, the two different sensing operations have been accomplished with two separately mounted sensor modules.

In accordance with the present invention, flywheel 220 may include, instead of individual sensors, a combined accelerometer-commutation sensor device in which a semiconductor-based accelerometer is combined with a hall effect commutation sensor in a single module. Once again, the present invention provides increased efficiency and reduced complexity by, for example, utilizing the same signal conditioning and driver circuit elements for both sensor systems. An additional advantage of this approach is that the sensing of vibration may occur directly on the bearing cartridge, rather than remotely.

A further improvement on the flywheel device described in the '645 patent relates to the rotor position sensing system. For control purposes, it is important to know the position of the rotor teeth or windings. Known methods of sensing rotor position typically utilize an optically or magnetically sensed gear pattern that is keyed to the rotor. While such devices can adequately determine rotor position, such devices require a relatively high level of precision in installation and maintenance to insure that the device has a specific angular alignment to the rotor. Additionally, such devices must be mechanically adjusted to set the control timing, while maintaining enough resolution to determine all of the required position information for adequate control.

In accordance with the present invention, flywheel 220 may include a digitally adjustable rotor position sensor system instead of one of the conventional position sensors. A digitally adjustable position sensor system includes a logic circuit that synthesizes all of the position information from the sensor with angular offset adjustment for a full 360 degree range. The digital system can utilize a sensor having as little as a single tooth of information to interpolate the entire set of required position information. The gear tooth device can simply be bolted to the end of the rotor shaft with any random angular alignment. Control timing, rather than requiring manual inputs, can be adjusted digitally. Moreover, the digital system optimizes its own performance by digitally adjusting rotor timing during normal operation.

A further embodiment of the present invention relates to the mounting of flywheel 220 within housing 110. Due to the high rotational speed of the rotor of flywheel 220, and the safety considerations that must deal with a potential torque fault—where the flywheel might break free of its bearings, flywheel units are typically mounted to a heavy gage steel chassis. In addition, the chassis is typically used as structure to mount the control electronics to as well. In accordance with the present invention, base 112 is configured such that only the lowest portion of the structure is formed of heavy gage welded steel. For example, FIGS. 2–4 show welded heavy gage steel pedestals 212 that are themselves welded to base plate 214. Moreover, instead of utilizing the heavy gage steel throughout the chassis, a lighter gage steel frame 216 is utilized which significantly reduces manufacturing costs and also reduces the overall weight of the system.

Another feature of the present invention related to mounting/installation will be apparent to those skilled in the art upon a further inspection of FIGS. 1–4 and 7. Typical flywheel devices often are installed on a concrete slab—once again, for safety purposes in the event of a torque failure—and secured by concrete anchors. First, the anchors are installed into the concrete and the system is positioned above the anchors. This process requires the alignment of the flywheel device with the anchors—a difficult process due to the overall weight of the flywheel device which may be on the order of 2800 pounds. Once alignment is obtained, mounting fasteners are installed and tightened, which requires tool access on each side of the unit. The tool access, however, requires the inclusion of a service corridor in the unit, thereby further increasing the overall footprint of the device. The present invention, however, simplifies installation and eliminates the service corridors without sacrificing safety by using a pair of lightweight cleats 112 for installation.

Installation is simplified, as is described below, because the cleats need only be aligned with two holes, instead of four, and the fasteners are secured via the edges of housing 110 so that no service corridors are required. As can be seen in FIGS. 1–4 and 7, each integrated UPS 100 is mounted on a pair of light-weight cleats 112. Each of cleats 112 is first mounted to a concrete base using concrete anchors through a pair of holes 702. Integrated UPS 100, which includes four "L-shaped" mounting brackets (not shown) connected to the bottom of housing 110, then is aligned with bolt holes 704 and 706. The mounting brackets each include a bolt hole that is aligned with one of holes 704 and 706. Installation is made easier than with conventional systems because alignment of two-anchor cleats 112 is simplified, and because UPS 100 may simply be slid into place and rested against cleats 112. The mounting brackets are then secured to the cleats using four mounting bolts (not shown) that may be easily accessed from the front edge of housing 110, thereby obviating the need for a service corridor.

UPS 240 also may be a conventional UPS system, except for the fact that it shares electronics with flywheel system 220. Alternately, in accordance with the present invention, UPS 240 may include one or more improvements as follows. The most common form of a UPS failure is related to the back-up power supply, which traditionally is a battery back-up power supply. One method which overcomes the problems related to the use of batteries is described in Pinkerton, U.S. Pat. No. 5,767,591 ("the '591 patent"), which describes using a flywheel energy storage device to provide start-up power to a diesel back-up power system. The '591 patent, however, describes a system in which the high frequency output of the flywheel drives a three-phase step-down transformer, which in turn, drives a three-phase rectifier thereby producing 24 VDC. While the system produces the improved reliability described in the '591 patent, the system requires expensive mechanical switches to disconnect the transformer during flywheel motoring. An additional potential problem is that the diesel starter may not be available continuously, because the transformer will be switched out during flywheel motoring.

Figure 8:
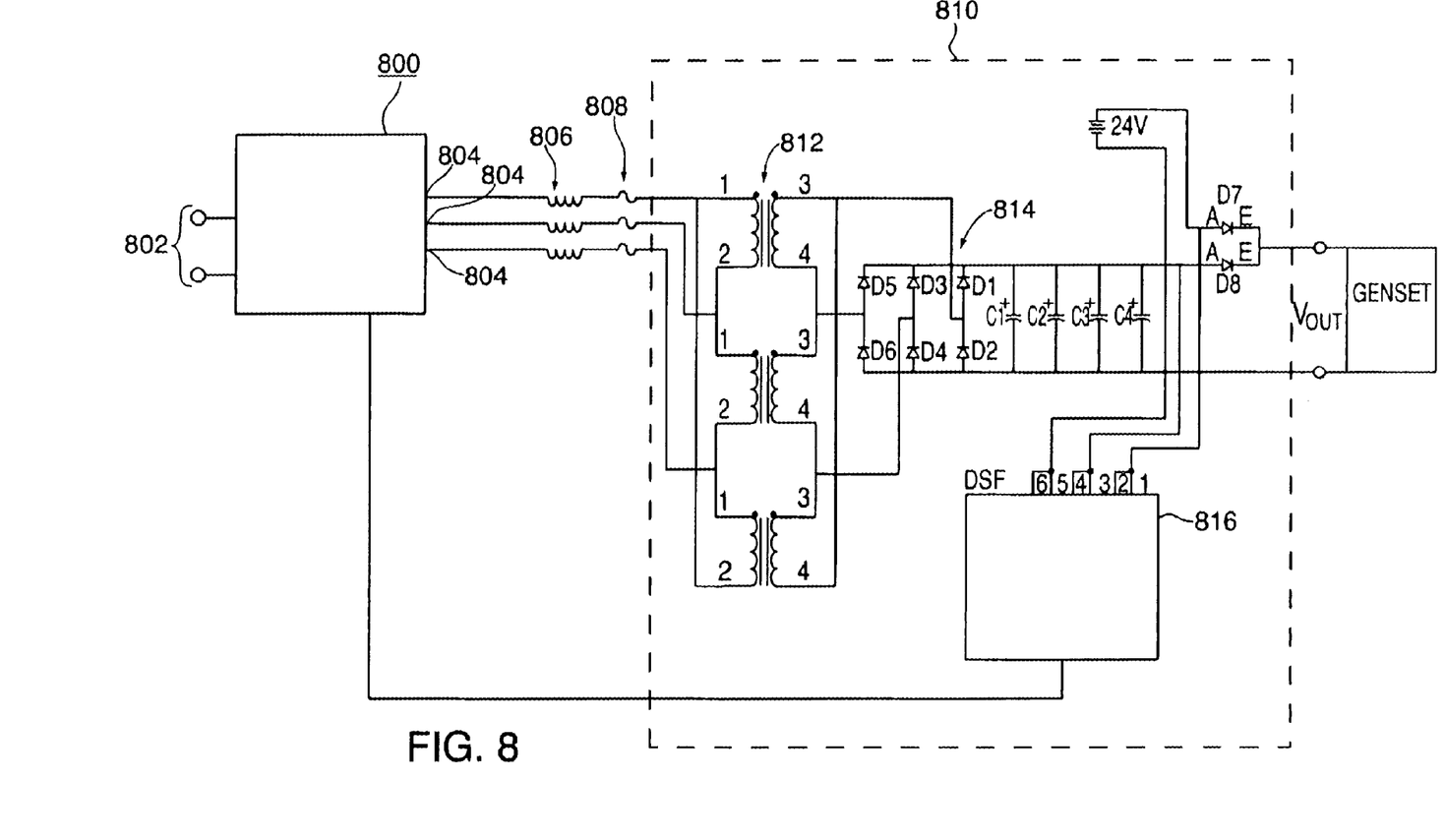
FIG. 8 is a schematic diagram of a GENSET startup circuit in accordance with the principles of the present invention.

UPS 240 may use a low cost, solid state, switching circuit 800 instead of the mechanical switches of known systems. By replacing the mechanical switches with an independent, solid state switching circuit, the UPS of the present invention can provide startup power to the diesel system continuously—even during flywheel motoring. FIG. 8 shows an illustration of switching circuit 800 which may be connected to GENSET circuitry 810 to provide a GENSET with startup power that is continuously available. DC input voltage is supplied to switching circuit 800 via input terminals 802, which are connected to the DC bus.

Switching circuit 800 may include switching and control electronics on, for example a single circuit card, but preferably, includes one circuit card for switching functions and another for control functions. The switching functions are accomplished by low cost, solid-state circuit components such as IGBTs that take the DC input and convert it to three phase AC output via terminals 804. The AC output is then fed to the GENSET circuitry 810 through inductors 806 and fuses 808. GENSET circuitry 810 may be installed, for example, in close proximity to the GENSET, rather than within housing 110. GENSET circuitry 810 may include, for example, step-down transformers 812 and rectifier circuitry 814 that converts the three-phase AC voltage into a 24 volt DC voltage that is provided via $V_{OUT}$.

Figure 9:
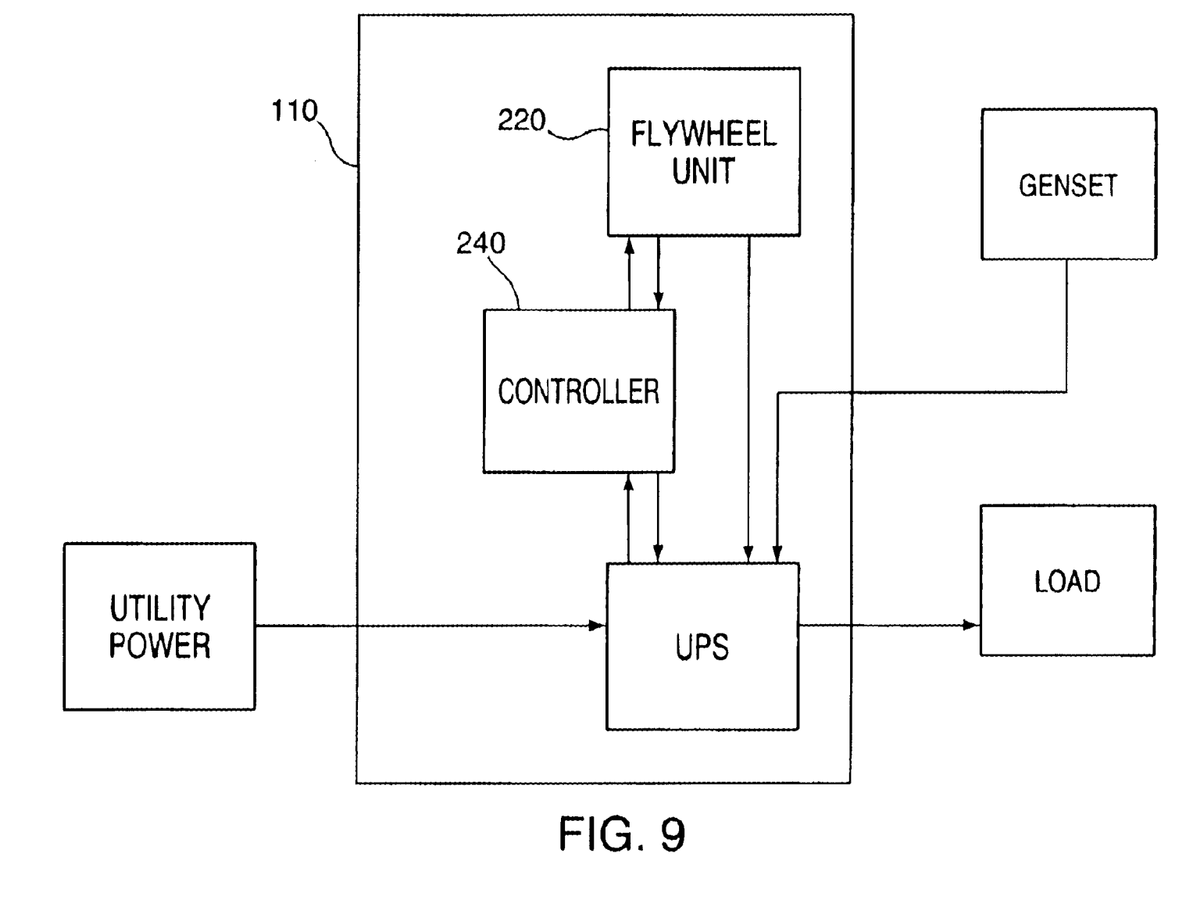
FIG. 9 is a block diagram of an integrated flywheel UPS system with a plurality of power sources that may be used to provide continuous power to a load in accordance with the principles of the present invention.

FIG. 9 is a block diagram of an integrated flywheel uninterruptible power supply (UPS) system that includes a flywheel unit, UPS and controller electronics. The UPS provides continuous power to a load from flywheel energy storage unit 220, utility power or a long term source of back-up power in accordance with the principles of the present invention. The long term source of power may be a GENSET interconnected to provide a continuous power feed to the load. UPS housing 110 encapsulates a UPS, a flywheel energy storage unit 220 and controller electronics 240 which is shared by both the UPS unit and flywheel energy storage unit 220 for control functions.

As shown in FIG. 9, continuous power is provided to a load through the use of an integrated UPS system. Under normal operating conditions, power is supplied to the load by the utility power. When there is a temporary interruption in utility power, for that time period, flywheel unit 220 becomes the primary source of power to the load. In addition, in the event of a longer duration of a loss in utility power, flywheel unit 220 initially provides the load with the necessary continuous power and also provides the GENSET with startup power (using circuitry such as that shown in FIG. 8) so that the GENSET provides long term back-up power to the load. In this manner, the load, as shown in FIG. 9, is provided with a continuous and constant feed of power under all conditions in accordance with the principles of the present invention.

Many known UPS systems also include static switches to provide the fast switching necessary for UPS operation. The static switch typically includes a pair of thyristors connected together in anti-parallel so that a bi-directional current path is provided. Known systems either gate both thyristors continuously to provide an ON state, or neither device is gated, thereby providing an OFF state. The potential problem occurs during UPS operation when the utility is down, because the gated thyristors are likely to allow backflow into the utility source. This may result in damage to the UPS circuitry, and/or the protected load. To avoid this potential problem, conventional systems end switch gating upon the first detection of a line fault, then UPS output does not begin to be provided until after the next time the utility voltage crosses zero. Unfortunately, the delay between detection and generation of the UPS output may produce a large voltage distortion to the load.

UPS 240, on the other hand, may be designed in accordance with the present invention to include a circuit that monitors the input current using a low cost current sensor. By monitoring current, the static switch can be controlled so that only the forward biased thyristor is gated, thereby eliminating the risk of backflow into the utility. Because the risk of backflow is eliminated, the UPS can produce output power upon the first detection of a line fault, without the previously seen delay.

UPS 240 also may be modified, in accordance with the principles of the present invention, to reduce problems that may occur when load conditions are such that a low power factor is present. The power factor, a measure of the ratio between resistive (e.g., heaters, lamps, etc.) and inductive (e.g., motors, etc.) loads, is defined as the cosine of the phase angle between current and voltage. The power factor varies between 0 and 1 so that, for example, a load with a power factor of 1 is purely resistive. Inductors, however, are widely used as filter elements in the output stage of UPS converters (typically, in combination with a capacitor, at a minimum). In most line interactive UPS systems, the inductor is used as a series pass element between the input and the output. Problems may occur when the power factor is low because, while the voltage drop across the inductor is largely independent of current, it is highly affected by power factor. Accordingly, low power factor can cause an under voltage condition, especially during the transfer of energy between the UPS and the utility.

UPS controller 240 may be modified to overcome non-unity power factor conditions by sensing the current and voltage of the output of the UPS and calculating the output power factor. The control circuitry of UPS controller 240 then utilizes the output power factor in order to calculate the inductive voltage, which is used to more closely regulate the output voltage.

The integrated digital control system of integrated UPS 100 also includes additional features that may be applicable to a wide range of applications. For example, digital control systems typically utilize a digital input stream that is based, at least in part, on analog measurements. The analog portion of the measurements typically contain noise, harmonics, and offset and gain errors that must be accounted for. Conventional systems often attempt to address these problems by utilizing, for example, passive filters, active filters, trimmable resistors (i.e., potentiometers), or by adjusting controller to compensate for the errors. Potentiometers, however, require a lengthy, iterative calibration process, while utilizing the controller to compensate for errors means that the controller then cannot use specific numerical values of the input signal directly.

The integrated digital control system of the present invention overcomes these deficiencies by utilizing a dedicated digital signal processor (DSP) that is inserted directly into the data acquisition pipeline to provide a continuous stream of error corrected data to the digital controller. Calibration of the system requires two measurements, from which a complete set of linear correction factors are calculated for each signal. The error correction factors are then stored in memory, such as FLASH memory, and provided to the DSP which compensates for input errors in the data stream. The use of the DSP for error correction eliminates the need for the potentiometers and the lengthy calibration process required to utilize such systems.

Integrated UPS 100 may be utilized in varying applications to provide, in addition to back-up power, a level of filtering so that utility power supplied to the load is of a higher quality than the signal received directly from the utility. Accordingly, there will be instances where integrated UPS 100 is installed in locations that are relatively remote, thereby making monitoring and control of the system somewhat difficult for system managers. One method to overcome these problems is to add a network expansion card to the system for remote access, or to connect a personal computer (PC) to the system via a serial communications line. These solutions, however, result, in one instance, in the loss of the serial line, as well as the expense requiring additional hardware (anywhere from an expansion card to a complete PC).

Integrated UPS 100 overcomes these deficiencies by integrating an ethernet controller directly on the processor motherboard of the flywheel/UPS control system, thereby minimizing hardware costs and increasing reliability. UPS 100 may be configured such that the operation of the flywheel and UPS system may be monitored with or without requiring an encryption key, however, changes to the system parameters would likely require some form of encrypted access to prevent tampering with the system. These features enable a facilities manager, for example, to remotely monitor and adjust (as necessary) the operation of one or more UPS 100 systems.

It will be understood that the foregoing is only illustrative of the principles of the invention, and that various modifications can be made by those skilled in the art without departing from the scope and spirit of the invention.

What is claimed is:

1. An integrated uninterruptible power supply system that provides continuous power to a load, said system comprising:
   a housing;
   a flywheel energy storage unit that provides short term back-up energy to said load, said flywheel energy storage unit being mounted within said housing; and
   an uninterruptible power supply (UPS) electronics unit that provides said continuous power to said load, said continuous power coming from said flywheel energy storage unit during a short term power outage of utility power and from said utility power after said short term power outage ends, said UPS electronics unit being mounted within said housing.

2. The uninterruptible power supply system of claim 1 further comprising a long term source of back-up power, said continuous power coming from said long term source of back-up power during a long term power outage of said utility power.

3. The uninterruptible power supply system of claim 2, wherein said long term source of back-up power is a GENSET.

4. The uninterruptible power supply system of claim 1, further comprising:
   a cooling system mounted within said housing that provides cooling to said flywheel energy storage unit and to said UPS electronics unit.

5. The uninterruptible power supply system of claim 4, wherein said cooling system comprises:
   a forced air convection cooling system that draws cooling air across said flywheel energy storage unit and said UPS electronics unit.

6. The uninterruptible power supply system of claim 5, wherein said forced air convection cooling system draws said cooling across said flywheel energy storage unit prior to being drawn across said UPS electronics unit.

7. The uninterruptible power supply system of claim 5, wherein said forced air convection cooling system comprises a plurality of fans.

8. The uninterruptible power supply system of claim 7, wherein said forced air convection cooling system further comprises a plurality of dampers such that each fan has a damper that vents air drawn by said fan outside of said housing.

9. The uninterruptible power supply system of claim 8, wherein said plurality of dampers each comprise a flap that is OPENED or CLOSED depending on pressure differential between pressure inside of said housing and pressure outside of said housing.

10. The uninterruptible power supply system of claim 5, wherein said forced air convection cooling system includes a fan array having at least one redundant fan.

11. The uninterruptible power supply system of claim 1, wherein said flywheel energy storage unit and said UPS electronics unit share a common controller that controls said flywheel energy storage unit and said UPS electronics unit.

12. The uninterruptible power supply system of claim 11, wherein said controller unit is a programmable unit.

13. The uninterruptible power supply system of claim 1, further comprising:
   a user interface panel that provides information on the operational status of said flywheel energy storage unit and said UPS electronics unit.

14. The uninterruptible power supply system of claim 1, further comprising emergency shut-down circuitry that shuts down said flywheel energy storage unit and said UPS electronics unit upon the detection of a unsafe condition.

15. The uninterruptible power supply system of claim 1, further comprising slotted bus plates coupled between said group consisting of said flywheel energy storage unit and utility power, and a DC bus in said system.

16. The uninterruptible power supply of claim 1, wherein said flywheel energy storage unit comprises circuitry that monitors power drawn by said load and, during LOW load conditions increases motor recharging current, and reduces motor charging current during HIGH load conditions.

17. The uninterruptible power supply system of claim 1, further comprising:
   a bank of DC capacitors coupled in parallel to a DC bus, said DC bus being shared by said flywheel energy storage unit and said UPS electronics unit.

18. The uninterruptible power supply system of claim 17, further comprising a plurality of fusible links connected to said capacitors such that a failure of any one of said capacitors causes said fusible link to fuse OPEN, thereby isolating said failed capacitor.

19. The uninterruptible power supply system of claim 1, wherein said flywheel energy storage unit comprises:
   a flywheel housing;
   a rotor having distal and proximal ends mounted within said flywheel housing;
   a pair of shaft bearings mounted in said flywheel housing such that one shaft bearing is mounted in proximity of said distal end of said rotor, and the other shaft bearing is mounted in proximity of said proximal end of said rotor; and
   a pair of sleeved bearings, each of which is mounted to one end of said rotor.

20. The uninterruptible power supply system of claim 1, wherein said flywheel energy storage unit comprises:
   a flywheel housing;
   a rotor mounted in said housing; and a single sensor system that senses both vibration and commutation of said rotor.

21. The uninterruptible power supply system of claim 1, wherein said flywheel energy storage unit comprises:
   a flywheel housing;
   a rotor mounted in said flywheel housing, said rotor having a shaft; and
   a digitally adjustable position sensor mounted to one end of said shaft that senses the rotational position of said rotor.

22. The uninterruptible power supply system of claim 1, wherein said housing comprises:
   a heavy gage steel base that said flywheel is mounted to;
   a light gage frame mounted to said base that supports control electronics for said flywheel energy storage unit and said UPS electronics unit.

23. The uninterruptible power supply system of claim 22, wherein said base is installed on a concrete slab utilizing lightweight cleats that are mounted to one side of said housing.

24. The uninterruptible power supply system of claim 2, wherein said long term source of back-up power is a diesel generator having a startup circuit, said flywheel energy storage unit comprising:
   a flywheel housing;
   a rotor mounted within said flywheel housing; and
   a DC output produced by a solid state switching circuit connected to said startup circuit of said diesel generator that provides continuous startup power to said startup circuit.

25. The uninterruptible power supply system of claim 1, wherein said UPS electronics unit comprises:
   a plurality of static switches, each of which includes a pair of thyristors connected together in anti-parallel;
   a monitoring circuit that monitors current being input to said UPS electronics unit; and
   a control circuit that, based on the monitored current, only gates a forward biased one of said pair of said thyristors.

26. The uninterruptible power supply system of claim 1, wherein said UPS electronics unit comprises:
   a sensor circuit that monitors an output of said UPS electronics unit and determines output current and output voltage;
   circuitry that determines output power factor based on said monitored current and voltage; and
   control circuitry that calculates inductive voltage of said UPS output and adjusts parameters of said UPS electronics unit such that input voltage into said UPS unit and output voltage out of said UPS electronics unit are closely matched.

27. The uninterruptible power supply system of claim 11, wherein said controller includes a digital signal processor (DSP) inserted in series with a data acquisition pipeline that provides input data to said controller, said data pipeline being produced at least by performing analog measurements that are converted to digital signals, said DSP providing filtering and error correction for offset and gain errors in said analog measurements.

28. The uninterruptible power supply system of claim 11, wherein said controller comprises:
   a motherboard that includes processing circuitry that performs control functions for said flywheel energy storage unit and said UPS electronics unit and network circuitry that provides a network interface for remote access to said controller.

29. An integrated uninterruptible power supply system that provides continuous power to a load, said system comprising:
   a housing;
   a flywheel energy storage unit that provides short term back-up energy to said load, said flywheel energy storage unit being mounted within said housing;
   a long term source of back-up power; and
   an uninterruptible power supply (UPS) electronics unit that provides said continuous power to said load, said continuous power coming from at least one of said flywheel energy storage unit or said long term source of back-up power during an interruption in utility power and from said utility power after said interruption ends, said UPS electronics unit being mounted within said housing.

30. An integrated uninterruptible power supply system that provides continuous power to an external load, said system comprising:
   a housing;
   a flywheel energy storage unit that provides short term back-up energy to said load, said flywheel energy storage unit being mounted within said housing; and
   an uninterruptible power supply (UPS) electronics unit that provides said continuous power to said load, said continuous power coming from one of the group consisting of said flywheel energy storage unit, utility power and a long term source of back-up power, said UPS electronics unit being mounted within said housing.

31. A stand alone integrated uninterruptible power supply system that provides continuous power to a load, said load being independent from said system, said system comprising:
   a housing;
   a flywheel energy storage unit that provides short term back-up energy to said load, said flywheel energy storage unit being mounted within said housing; and
   an uninterruptible power supply (UPS) electronics unit that provides said continuous power to said load, said continuous power coming from one of the group consisting of said flywheel energy storage unit, utility power and a long term source of back-up power, said UPS electronics unit being mounted within said housing.

* * * * *